Sept. 30, 1947. H. WOLFSON ET AL 2,428,059
SEALING OF WIRES INTO GLASS
Filed Feb. 5, 1944
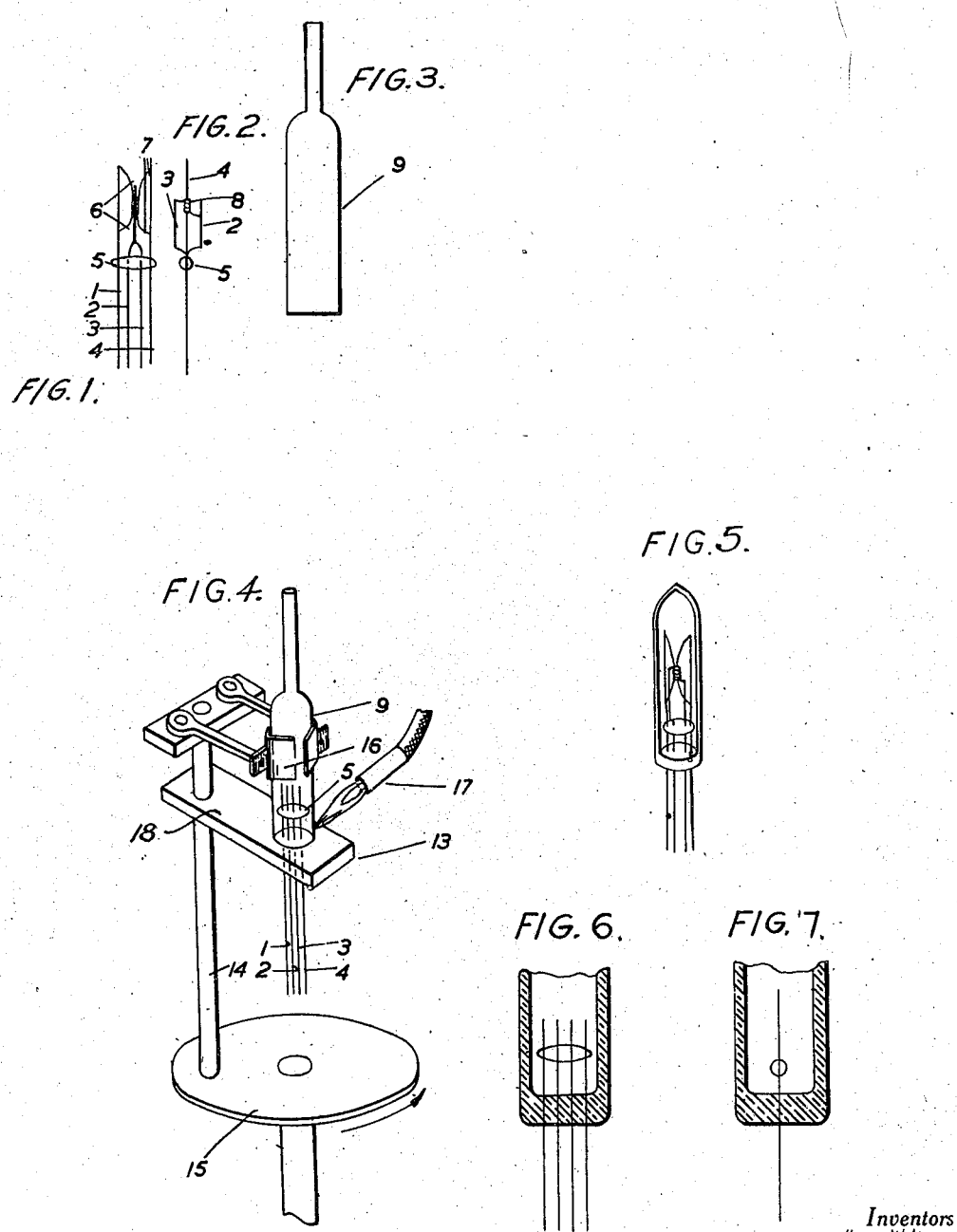
Inventors
Henry Wolfson.
Stanley Garden Shepard
By
Attorney Patented Sept. 30, 1947

2,428,059

UNITED STATES PATENT OFFICE 2,428,059

SEALING OF WIRES INTO GLASS

Henry Wolfson and Stanley Carden Shepard, London, England, assignors, by mesne assignments, to International Standard Electric Corporation, New York, N. Y., a corporation of Delaware Application February 5, 1944, Serial No. 521,290
In Great Britain February 24, 1943

4 Claims. (Cl. 49—81)

The present invention relates to sealing wires into glass tubes and is particularly suited to tubes of small cross-section, for example tubes used for enclosing directly or indirectly heated resistances known as thermistors. Thermistors are usually semi-conductors which possess an abnormally high resistance-temperature coefficient, either positive or negative, and may have a size equal to that of a pin-head. Owing to the smallness of these resistances, and for other reasons such as the requirement of enclosing them in a gas atmosphere, or in vacuum, the thermistors are enclosed in small glass envelopes which may comprise small lengths of glass tubing closed at one end and wires leading to the thermistor resistance and if present, an associated heating coil, are sealed in the glass tube at the other end, or wires may be sealed in both ends of the tube. The present invention is particularly though not specifically adapted to apparatus of this type and size.

The present invention provides a simplified method which requires no complicated machinery. This is attained by holding the wires in a glass tube heating the end of the tube and allowing the softened glass to run around the wire and close the end of the tube, either by surface tension or under the weight of the tube.

The accompanying drawings illustrate diagrammatically the invention. In the drawings:

Fig. 1 shows a front view of a thermistor assembly;

Fig. 2 shows a side view of the thermistor assembly;

Fig. 3 shows the envelope of a thermistor prior to the insertion of assembly of Figs. 1 and 2;

Fig. 4 shows one form of a machine for sealing and moulding the thermistor assembly in the envelope according to applicants' method;

Fig. 5 shows a thermistor sealed into a glass envelope according to the present invention; and Figs. 6 and 7 show enlarged sectional views of the thermistor of Fig. 5.

Referring to Figs. 1-3, the assembly consists of lead wires 1, 2, 3 and 4, which pass through a glass bead 5. Leads 6 and 7 from the thermistor bead are connected to leads 1 and 4. The resistance is enclosed in a heater coil 8, the leads of which are connected to wires 2 and 3.

No complicated mechanism is necessary for the machine used in the method according to this invention. A form of machine is shown in Fig. 4. The lead wires 1, 2, 3 and 4 of the assembly held in relative positions by the glass bead 5 are held by a jig 13 which is supported by a rod 14 fixed to a rotating platform 15. The jig 13 is so constructed that the assembly will remain in position under its own weight, but if pressure is exerted either up or down, it may be made to slide in the direction desired. The bulb 9 is placed over the assembly and rests on the jig 13. It is also held by jaws 16 such that during the sealing-in process it does not drop under its own weight except when desired. As the machine is rotating, a gas-oxygen flame 17 is played on the open end of the glass bulb 9. The glass softens and flows, and closes the end of the bulb. The flame is removed and whilst the glass is still soft pressure may be exerted on the top end of the bulb and the softened end is pushed against the hard surface 18 of the assembly jig 13. The end of the bulb is thus flattened. Fig. 5 shows a thermistor assembly which has been sealed in by this process. In Figs. 6 and 7 are shown enlarged sectional views of the seal taken from perpendicularly related directions. By arranging a suitable mould on the jig 13, the end of the bulb may be caused to take up any other desired shape.

When the wires have been sealed-in the tube 9 is evacuated or gas-filled as required and sealed off according to known practice.

Alternatively, the wires may be held in a jig in a horizontal position and the glass tube 9 placed thereover with its axis horizontal.

The jig is rotated about a horizontal axis and a flame is played upon the end of the tube from above. As the glass softens it flows around the wires by force of gravity or surface tension. The flame is removed and whilst the glass is still soft, the tube is pressed for example on the hard surface of the jig by hand to flatten the end of the tube and if a mould is used, to cause the end of the tube to take up the form of the mould.

Whilst the invention has been described in relation to thermistor elements by way of example only, it will be understood that it can be applied to any articles in which wires are to be sealed in glass tubes.

What is claimed is:

1. The process of sealing wires into and moulding an end of a glass tube including the steps of holding wires in their required relative positions in a jig with a hard surface, placing thereover a glass tube, securing said tube with one end adjacent the hard surface of the jig, heating the said one end of the glass tube to the softening point of the glass thereby allowing the softened glass to flow around the wires by the surface tension of the softened glass, and pushing the softened end of the glass tube against the hard surface by pressing the glass tube axially in the direction of the softened end so as to seal the wires into the end of the tube and to mould said end.

2. The method of sealing wires into and moulding an end of a glass tube including the steps of holding wires vertically in their required relative positions in a jig with a flat surface, placing thereover a glass tube in a vertical position with the lower end thereof resting on the flat surface of the jig, securing the glass tube from sliding except under pressure other than its own weight, heating the lower end of the glass tube to the softening point of the glass thereby allowing said softened glass to flow around the wires and form a seal by the surface tension of the softened glass, and pushing the softened end of the tube against the flat surface by pressing the glass tube down so as to seal the wires into the end of the tube and to flatten said end.

3. The process of sealing wires into and moulding an end of a glass tube including the steps of assembling wires in their required relative positions, holding the assembled wires in a vertical position in a jig with a hard surface, placing thereover a glass tube with the lower end in contact with the hard surface of the jig, securing the tube from sliding except under pressure, rotating said tube and said jig, heating the lower end of the glass tube to the softening point of the glass thereby allowing said softened glass to flow around the wires and form a seal by the surface tension of the softened glass, and pushing the softened end of the tube against the hard surface by pressing the glass tube axially in the direction of the softened end so as to seal the wires into the end of the tube and to mould said end.

4. The method of sealing wires into and moulding an end of a glass tube including the steps of holding wires in their required relative positions in a jig with a hard surface, placing thereover a glass tube with one end adjacent said surface, heating said one end of the tube to the softening point of the glass, thereby allowing the softened glass to flow around the wires by the surface tension of the softened glass, and forcing the softened glass against the hard surface by pressure applied axially of the tube, so as to form a sealed-in tube and to mould the said one end into which the wires are sealed.

HENRY WOLFSON.
STANLEY CARDEN SHEPARD.

REFERENCES CITED

The following references are of record in the file of this patent:

UNITED STATES PATENTS

| Number | Name | Date |
| --- | --- | --- |
| 1,372,294 | Karabin et al. | Mar. 22, 1921 |
| 1,965,408 | Eden et al. | July 3, 1934 |
| 2,235,515 | Carpenter | Mar. 18, 1941 |
| 2,107,254 | Horn | Feb. 1, 1938 |
| 2,174,375 | Beggs | Sept. 26, 1939 |
| 42,931 | Demuth | May 31, 1864 |
| 2,153,404 | White et al. | Apr. 4, 1939 |